(12) United States Patent
Masterson et al.

(10) Patent No.: US 6,724,787 B2
(45) Date of Patent: Apr. 20, 2004

(54) LOW NOISE SOLID STATE LASER

(75) Inventors: Bernard P. Masterson, Louisville, CO (US); Henrik Hofvander, Boulder, CO (US)

(73) Assignee: Melles Griot, Inc., Carlsbad, CA (US)

( * ) Notice: Subject to any disclaimer, the term of this patent is extended or adjusted under 35 U.S.C. 154(b) by 6 days.

(21) Appl. No.: 10/016,377

(22) Filed: Dec. 10, 2001

(65) Prior Publication Data

US 2003/0021325 A1 Jan. 30, 2003

Related U.S. Application Data

(60) Provisional application No. 60/254,292, filed on Dec. 8, 2000.

(51) Int. Cl.[7] .............................................. H01S 3/10
(52) U.S. Cl. ........................... 372/21; 372/22; 372/27
(58) Field of Search .............................. 372/21, 22, 75, 372/27

(56) References Cited

U.S. PATENT DOCUMENTS

| | | | |
|---|---|---|---|
| 4,933,947 A | | 6/1990 | Anthon et al. |
| 5,164,947 A | | 11/1992 | Lukas et al. |
| 5,287,381 A | * | 2/1994 | Hyuga et al. ................. 372/75 |
| 5,627,849 A | | 5/1997 | Baer |
| 5,732,095 A | * | 3/1998 | Zorabedian ................... 372/22 |

FOREIGN PATENT DOCUMENTS

| | | |
|---|---|---|
| EP | 0455383 A2 | 6/1991 |
| WO | WO 96/36095 | 11/1996 |

OTHER PUBLICATIONS

Michio oka et al., Stable Intracavity Doubling of Orthogonal Linearly Polarized Modes in diode–Pumped Nd: Yag Lasers, Opotical Society of America, Optics Letters, Oct. 1988, vol. 13. No. 10.*

Alan J Kemp, Ploariztion Effects, Biregringent Filtering, and Single–frequency Operation in Lasers containing a Birefringent Gain Crystal, 2000 IEEE, IEEE Journal of Quantum Electronics, vol. 36. No. 2., Feb. 2000.*

Anthon, D., "Passive FM Laser Operation and the Stability of Intracavity–Doubled Laser", Applied Optics, vol. 38, No. 24, Aug. 1999, pp. 5144–5148.

Anthon, D.W. et al., "CWC3 Stable Multilongitudinal–Mode Operation of a Diode–Pumped Twisted–Mode Intracavity Doubled Nd:YAG Laser", Cleo Conference, 1990, p. 232, no month.

Anthon, D.W. et al., "Intracavity Doubling of CW Diode–Pumped Nd:YAG Lasers with KTP", IEEE Journal of Quantum Electronics, vol. 28, No. 4, Apr. 1992, pp. 1148–1157.

(List continued on next page.)

*Primary Examiner*—Paul Ip
*Assistant Examiner*—Hung T Vy
(74) *Attorney, Agent, or Firm*—Law Offices of James D. McFarland

(57) ABSTRACT

A low noise laser includes a birefringent gain crystal arranged so that polarization is not constant within the gain crystal. The gain crystal and an intracavity optical element each have a nonzero polarization retardance. The total single-pass retardance is approximately equal to an odd multiple of one-half wave; for example each may provide one quarter wave retardance. In one embodiment the optical element comprises a nonlinear crystal situated within the laser cavity for Type II frequency doubling. The principal crystal axis of the gain crystal is offset from the principal axis of the nonlinear crystal at an offset angle for example about 45°. In one embodiment a gain crystal and frequency-doubling crystal are coupled together to form a monolithic laser component. An alternative embodiment is described in which the optical element comprises a quarter-wave plate and the laser output includes substantially two linear polarizations at the fundamental wavelength.

42 Claims, 2 Drawing Sheets

OTHER PUBLICATIONS

Baer, T., "Large–Amplitude Fluctuations Due to Longitudinal Mode Coupling in Diode–Pumped Intracavity–Doubled Nd:YAG Lasers", J. Opt. Soc. AM.B, vol. 3, No. 9, Sep. 1986, pp. 1175–1180.

Byer, R., "Diode Laser–Pumped Solid–State Lasers", SCIENCE, vol. 235, Feb. 1988, pp. 742–747.

Hadjar, Y. et al., "Stable 120–mW Green Output Tunable Over 2 THz by a Second–Harmonic Generation Process in a KTP Crystal at Room Temperature", Optics Letters, vol. 25, No. 18, Sep. 2000, pp. 1367–1369.

Kemp, A. et al., "Polarization Effects, Birefringent Filtering, and Single–Frequency Operation in Lasers Containing a Birefringent Gain Crystal", IEEE Journal of Quantum Electronics, vol. 36, No. 2, Feb. 2000, pp. 228–235.

Oka, Michio et al., "Stable Intracavity Doubling of Orthogonal Linearly Polarized Modes in Diode–Pumped Nd:YAG Lasers", Optics Letters, vol. 13, No. 10, Oct. 1988, pp. 805–807.

Sasaki, T. et al., "Single–Longitudinal–Mode Operation and Second–Harmonic Generation of $Nd:YVO_4$ Microchip Lasers", Optics Letters, vol. 16, No. 21, Nov. 1991, pp. 1665–1667.

Tatsuno, T. et al., "CWQ8 Highly Efficient and Stable Green Microlaser Consisting of $Nd:YVO_4$ With Intracavity KTP For Optical Storage", Cleo Conference, 1992, p. 374 and 376.

Tsunekane M. et al., "Elimination of Chaos in a Multilongitudinal–Mode, Diode–Pumped, 6–W Continuous–Wave, Intracavity–Doubled Nd:YAG Laser", Optics Letters, vol. 22, No. 13, Jul. 1997, pp. 1000–1002.

Yaney, P. et al., "Spectroscopic Studies and Analysis of the Laser States of $Nd^{3+}$ in $YVO_4$,", J. Opt. Soc. Am., vol. 66, No. 12, Dec. 1976, pp. 1405–1414.

* cited by examiner

LOW NOISE SOLID STATE LASER

CROSS-REFERENCE TO RELATED APPLICATION

Priority is hereby claimed to U.S. Provisional Application No. 60/254,292, filed Dec. 8, 2000, entitled LOW-NOISE DIODE-PUMPED SOLID STATE LASER, which is incorporated by reference herein.

BACKGROUND OF THE INVENTION

1. Field of the Invention

The present invention relates to frequency-converted solid state lasers that include an intracavity non-linear solid state element for frequency conversion.

2. Description of Related Art

It is well known that intracavity-doubled diode pumped solid state ("DPSS") lasers often exhibit chaotic amplitude fluctuations, spiking, and hysteresis. One explanation of this behavior relates to two nonlinear couplings-spatial hole burning and sum frequency generation-between different lasing modes. This chaotic noise problem appears in many diode-pumped solid state lasers at all wavelengths, although it is sometimes termed the "green problem". Prior techniques proposed to avoid chaotic noise in intracavity-doubled lasers include:

1. Operating the laser in a single longitudinal mode. One disadvantage of this approach is that it generally requires frequency-selective elements in the laser cavity, increasing cavity loss, cost, complexity and size.
2. Operating the laser in hundreds of longitudinal modes, resulting in an averaging of noise. This approach generally requires a long cavity, and noise is reduced only as the inverse square root of the number of modes oscillating.
3. Eliminating spatial hole-burning by enforcing circular polarization within the gain medium, which requires a non-birefringent gain medium and additional intracavity polarization-control elements. This approach is not suitable for a gain medium such as $Nd:YVO_4$, which is highly birefringent.
4. Two-mode operation: situating the gain and nonlinear crystals at specific points in a standing-wave cavity where it is believed spatial hole-burning and sum frequency generation between the two oscillating modes are reduced, such as disclosed in U.S. Pat. No. 5,627,849.
5. Phase-locking: arrange for oscillation in a set of phase-locked modes to avoid chaotic noise. The conditions necessary to reliably achieve phase locking are not clear, and therefore phase-locked lasers typically exhibit inconsistent performance.
6. Eliminating the nonlinear coupling due to sum-frequency generation by altering the polarization in the nonlinear crystal. This approach requires a separate quarter-wave plate, which adds cost and complexity to a system, and increases losses.

All of these approaches have disadvantages, especially when used with a birefringent gain crystal such as $Nd:YVO_4$.

Laser gain media typically comprise a crystalline structure, in which the crystal axes are specified by three axes: the a-axis, b-axis, and c-axis. In order to obtain high efficiency in a birefringent gain medium such as $Nd:YVO_4$, the intracavity elements of the laser are typically arranged in such a way that the fundamental emission is linearly polarized in alignment with the c-axis throughout the laser crystal. Therefore, in conventional solid state laser systems there is substantially no polarization change within the $Nd:YVO_4$ crystal.

In order to align the intracavity laser beam along the c-axis within the laser crystal in one conventional implementation, the nonlinear crystal is temperature-tuned to provide a one-pass polarization retardance of one-half wave, which translates to a total cavity retardance of one full wave outside of the laser crystal, thus ensuring that the intracavity laser beam will be linearly polarized along the c-axis of the laser crystal. However, if two or more longitudinal modes are oscillating in the laser, this configuration is susceptible to so-called "green problem" chaotic noise since these two modes are forced to oscillate substantially along the same path; accordingly such lasers are typically designed for single mode operation. Unfortunately, single mode operation typically magnifies spatial hole burning problems within the gain medium, which destabilizes the fundamental emission.

SUMMARY OF THE INVENTION

The device described herein provides a way to reduce or eliminate noise in intracavity-doubled lasers in a very simple and compact package. Particularly, the device may reduce or eliminate noise that may be caused by chaotic amplitude fluctuations, spiking and hysteresis, such as may be caused by spatial hole-burning and sum frequency generation nonlinear coupling between different lasing modes. Embodiments are described in which noise reduction is provided by arranging the gain crystal and nonlinear crystal to provide a one pass polarization retardance about one-half wave or an odd multiple thereof, thereby eliminating the need for additional cavity elements, simplifying production requirements, reducing costs, and promoting higher efficiency in some embodiments.

A laser described herein includes a birefringent gain crystal arranged in a cavity to rotate polarization of the fundamental emission, resulting in a polarization that is not constant within the gain crystal. It is believed that the polarization rotation of the two modes within the gain crystal substantially reduces or even eliminates spatial hole burning.

A low-noise laser that provides a laser beam at a predefined lasing wavelength comprises a laser cavity and a birefringent gain crystal such as $Nd:YVO_4$ situated within the laser cavity. The gain crystal is configured so that the fundamental laser emission within the laser crystal has a non-constant polarization, thereby providing a first predetermined nonzero amount of polarization retardance at the lasing wavelength. An optical element is situated within the laser cavity, the optical element configured to provide a second nonzero predetermined amount of polarization retardance that, in conjunction with the birefringent gain crystal, provides a total single-pass retardance for the laser cavity that limits laser noise within the laser cavity. In some embodiments the total single-pass retardance is approximately equal to an odd multiple of one-half wave; for example if the first predetermined retardance is approximately one-quarter wave, then the second predetermined retardance is approximately one-quarter wave. The number of longitudinal cavity modes is limited to substantially two, and each mode tends to follows a different polarization within the laser cavity.

In one embodiment the optical element comprises a nonlinear crystal situated within the laser cavity for Type II doubling. The principal crystal axis of the gain crystal is oriented in a first direction orthogonal to the axis of the laser cavity, the principal axis of the nonlinear crystal is oriented in a second direction orthogonal to the axis of the laser cavity, and the first and the second directions have a nonzero offset angle from each other. The offset angle may be within a range of about 30° to about 60° for example about 45°.

In an alternative embodiment, the optical element comprises a quarter-wave plate. In one such embodiment the laser output comprises the lasing wavelength, including substantially a first linear polarization and a second linear polarization that is orthogonal to the first linear polarization.

In one embodiment the gain crystal and nonlinear material are coupled together, such as by bonding or optical contact, to form a monolithic component. Low-noise operation can be achieved with the monolithic component over greater than 10° C. temperature ranges. This low-noise operation is also largely insensitive to pumping conditions (pump laser power, wavelength, spot size) and is expected to be scalable to high output powers. The low-noise laser described herein is therefore well-suited to applications that require a low-cost, rugged, and compact source of laser light.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Glossary of Terms and Acronyms

Figure 1:
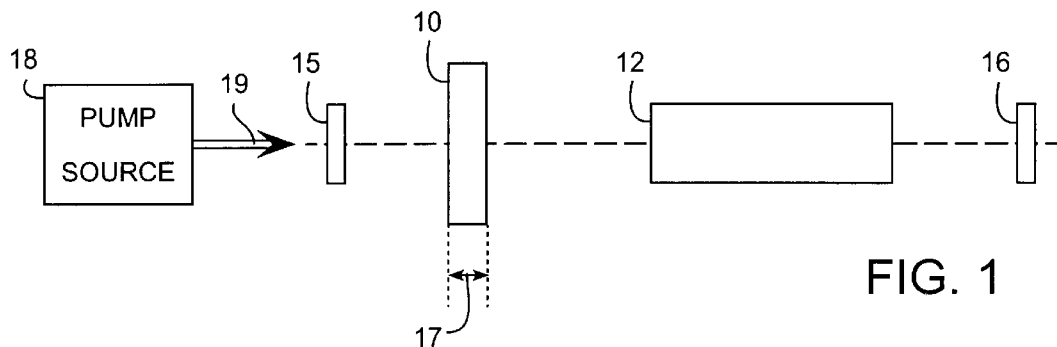
FIG. 1 is a diagram of a frequency-converted solid state laser.

The following terms and acronyms are used throughout the detailed description:

Anisotropic: A nonlinear material that exhibits different optical properties along different axes of propagation or for different polarizations of a traveling wave. Typically a crystal whose structure defines three axes: an a-axis, a b-axis, and a c-axis, at least two of which have differing indexes of refraction.

Frequency doubling: A nonlinear process in which the frequency of an optical beam is doubled. Because the frequency and wavelength are related by the well-known equation $c=\lambda v$, doubling frequency is equivalent to halving the wavelength.

Retardance: (also polarization retardance) A quality of anisotropic optical materials, in which a traveling beam's polarization is changed in accordance with the crystal orientation and the degree of anisotropy of the nonlinear material.

Birefringent: An anisotropic material arranged so that a ray traveling through the material is subject to different indices of refraction dependent upon its polarization.

Overview

An intracavity-doubled laser operating substantially without chaotic ("green problem") noise is disclosed that utilizes a birefringent gain crystal to rotate polarization of the fundamental emission, resulting in a polarization that is not constant within the gain crystal. It is believed that the polarization rotation of the two modes within the gain crystal substantially reduces or even eliminates spatial hole burning problems.

In some embodiments, it is believed that by 1) limiting oscillation at the fundamental lasing wavelength to substantially two longitudinal modes by cavity length or by frequency-selective elements, 2) arranging the gain crystal and the nonlinear crystal so that each provides polarization retardance of about one-quarter wave, and 3) orienting the principal crystal axes of the gain crystal and nonlinear crystal so that they are separated by about 45°, only two modes of orthogonal polarization can effectively oscillate. The two orthogonal laser modes saturate the gain very efficiently, leaving little gain for any other possible lasing modes, which increases the robustness and stability of this lasing configuration. Furthermore, it is believed that the two nearly orthogonal polarizations typically have a roughly equal amplitude. Due to the orthogonal polarizations between the two modes, they do not substantially interact, thereby avoiding generation of chaotic noise. As a result, quiet laser operation ensues.

As an example of the polarization differences in one embodiment, in the space between the gain crystal and the doubling crystal the one-way polarization of each mode is circular but orthogonal; at the outside surfaces of the gain and retarder elements, the polarization of each mode is linear and substantially perpendicular to the other mode. Within the gain material, the polarization of each mode evolves rapidly.

In one embodiment, the laser is frequency-doubled, including a Type II doubling crystal, and the retardances of the crystals are separately close to quarter-wave; in other words, the gain crystal provides approximately quarter-wave retardance, and the doubling crystal provides a quarter-wave retardance. In one embodiment, the principal crystal axes of the gain crystal and the nonlinear crystal are arranged orthogonal to the laser axis, but separated by an angle within the range of about 30° to 60°, and preferably about 45°.

In embodiments in which the gain crystal and a nonlinear doubling crystal together provide the total half-wave retardation, this method of achieving low-noise operation requires no additional cavity elements, thereby reducing cost, size and complexity. Furthermore, since a crystal's polarization retardance generally shifts only slowly with temperature shifts, the laser's sensitivity to temperature change is low. Likewise, there is not a critical dependence on cavity length.

Description

This invention is described in the following description with reference to the Figures, in which like numbers represent the same or similar elements.

FIG. 1 is a side view of a laser embodiment comprising a solid state gain crystal 10 (sometimes called "laser crystal") and a nonlinear crystal 12 arranged for frequency doubling the fundamental emission. The gain crystal 10 is birefringent; one embodiment uses a gain crystal of neodymium-doped yttrium orthovanadate (Nd:YVO$_4$), and a nonlinear crystal comprising potassium titanyl phosphate (KTP) arranged for Type II frequency doubling. In alternative embodiments different birefringent gain crystals and different nonlinear crystals may be used; for example in other embodiments the gain crystal may comprise Cr:LiSAF.

A laser cavity defines a laser axis 14 between a first end reflector 15 and a second end reflector 16. The end reflectors that define the cavity may either be separate mirrors, as shown, or may be coated directly onto the gain and/or nonlinear crystals without departing from the spirit of the invention.

The gain crystal 10 and the nonlinear crystal 12 are arranged (by temperature control, crystal thickness control or other means) in a configuration to limit noise and/or instabilities in the cavity. In one such embodiment, the birefringent gain crystal (e.g. Nd:YVO$_4$) is configured to have a predetermined amount of polarization retardance at the lasing wavelength by polishing, temperature-tuning, or other suitable means. The net retardance in the remainder of the laser cavity is such that the total single-pass retardance of the fundamental emission within the laser cavity is an odd multiple of one half-wave (i.e. $\lambda/2$, $3\lambda/2$, $5\lambda/2$, $7\lambda/2$, and so forth). For example if the two crystals 10 and 12 each provide about one quarter-wave retardance at the fundamental emission, then the total one-pass polarization retardance is $\lambda/2$.

In one embodiment that utilizes Nd:YVO$_4$ as a gain crystal 10, the crystal is produced to have a length along the lasing axis that retards polarization by about one quarter-wave. Due to the high birefringence of Nd:YVO$_4$ the polarization retardance is highly sensitive to slight variations in its length. One way of producing a Nd:YVO$_4$ crystal that has a quarter-wave polarization retardance is to polish it very precisely, measure its polarization retardance, and then continue to alternately polish the crystal and measure its polarization retardance until it provides the desired one-quarter wave polarization retardance. A similar process could also be used with other gain crystals 10 in order to provide the desired quarter-wave polarization change. Likewise, a similar process can be utilized with the nonlinear crystal 12 to create a quarter-wave polarization retardance; however, in some embodiments it may be more cost-effective and practical to temperature-tune the crystals rather than to precisely polish their lengths. It should be recognized that material processing and subsequent tuning techniques are imprecise, and that small variations from quarter-wave retardance (e.g. 0.1 wave) may exist between either of the crystals.

In one embodiment, the birefringent gain crystal is arranged with its principal axis orthogonal to the laser axis and the nonlinear crystal 12 (e.g., KTP) is also arranged with its principal axis orthogonal to the laser axis; however, the two principal axes are offset as described in more detail with reference to FIG. 2.

It is believed that the lasing state of the low-noise laser described herein comprises two separate longitudinal modes having orthogonal polarizations with respect to each other. Accordingly, the laser cavity is designed so that lasing is restricted to just a few longitudinal modes (e.g. 1 to 5), such as by short cavity length, a short gain crystal, a narrow gain curve, or other frequency-selection technique. In order to provide substantially two longitudinal modes, the gain crystal width 17 may be small, e.g. less than about 2 mm. In alternative embodiments, lasing may be limited to two modes using other techniques such as an etalon.

The laser cavity is designed for substantially single transverse mode operation by any suitable means; for example other intracavity elements may be included. In many embodiments, the transverse mode structure is TEM$_{00}$ for each of the two primary longitudinal modes; however additional transverse mode structures may exist in small amplitudes. In alternative embodiments, the two modes may be other than TEM$_{00}$, as long as they are the same; for example the transverse modes of the two primary longitudinal modes could be TEM$_{01}$.

A pump source 18 is provided to pump the gain crystal 10 with optical pump radiation 19. Any suitable method of pumping can be used; for example, end pumping using a laser diode, side pumping, or other suitable pumping systems can be utilized. In an end pumping configuration, the pump radiation 19 is typically focused via a relay lens through the first end mirror 15 and then into the gain crystal 10.

Figure 2:
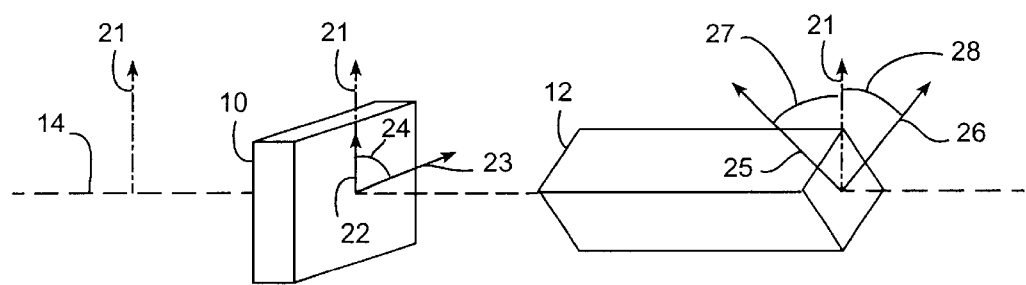
FIG. 2 is a perspective view of the gain crystal and nonlinear crystal, illustrating crystal orientations.

FIG. 2 is a perspective diagram of the crystal orientations of the gain crystal 10 and the nonlinear crystal 12 in one embodiment. For discussion purposes a vertical reference 21 is defined in a plane extending vertically from the laser axis 14. The crystalline structure of the gain crystal 10 defines a principal axis 22 and a second axis 23 that both extend approximately orthogonally from the laser axis 14. For convenience of description, the principal axis 22 is arranged to be approximately aligned parallel with the vertical reference 21, and the second axis 23 is arranged to define an angle 24 of approximately 90° with the vertical reference 21. The nonlinear crystal 12 defines a principal axis 25 and a second axis 26 both of which extend approximately orthogonally from the laser axis 14. The principal axis 26 is aligned to define a first angle 27 with respect to the vertical reference 21, which aligns the second axis at a second angle 28 with respect to the vertical reference 21. In this configuration, the principal axis 25 of the nonlinear material 12 is "offset" with respect to the laser crystal's principal axis 22 by the amount of the first angle 27, which may be termed the "offset angle". The amount of the offset varies with the embodiment, in some embodiments the offset angle is within a range of about 30° to about 60°, and preferably about 45°. In summary, in this configuration the principal crystal axes 22 and 25 are both orthogonal to the laser axis, but not aligned with (offset from) each other by an offset angle.

In some embodiments the gain crystal comprises Nd:YVO$_4$. The crystal structure of Nd:YVO$_4$ defines three axes: an a-axis, a b-axis, and a c-axis. Typically, the symmetry axis of the laser crystal is defined by the c-axis, and therefore the Nd:YVO$_4$ crystal can be arranged so that the laser axis is orthogonal to either: 1) the c-axis and the a-axis, or 2) the c-axis and the b-axis.

As disclosed with reference to FIG. 1 for example, the laser is designed to limit the number of longitudinal modes. For discussion purposes, it may be assumed that substantially only two longitudinal modes are allowed to oscillate. Because laser oscillation tends to find the configuration that most efficiently uses the available gain, these two longitudinal modes respectively follow the two different polarization patterns that have the least loss; in other words a first longitudinal mode develops along a first polarization pattern and a second longitudinal mode develops along a second, different polarization pattern.

Figure 3:
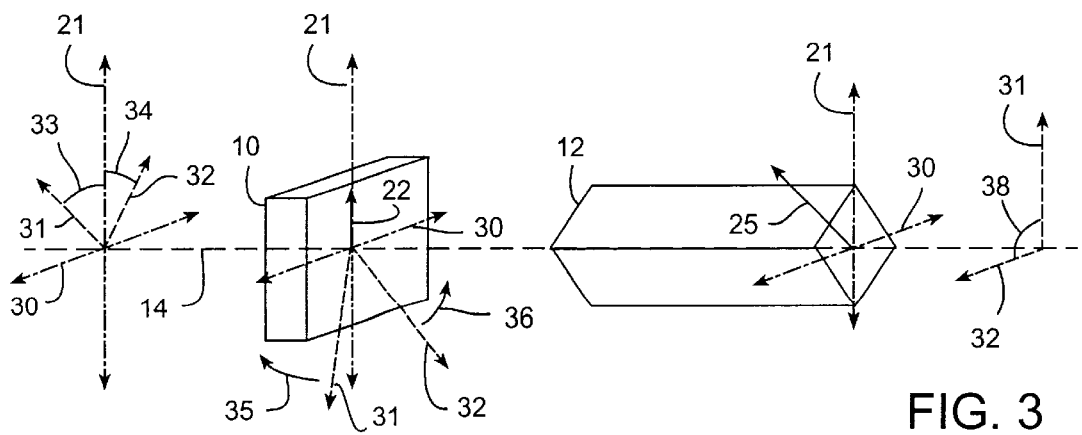
FIG. 3 is a perspective view of the gain crystal and nonlinear crystal, illustrating polarizations in one embodiment.

FIG. 3 is a schematic diagram that depicts one example of the different polarizations of the two longitudinal modes as they evolve within the laser cavity in one embodiment. For purposes of description, a horizontal reference 30 is provided perpendicular to the vertical reference 21 and orthogonal to the laser axis 14. The first longitudinal mode has a polarization represented by direction arrow 31, and the second longitudinal mode has a polarization represented by direction arrow 32. As shown in FIG. 3, the polarization state of the two polarized modes of the fundamental laser emission is different in different sections of the laser cavity. In this embodiment, from the left end of the laser cavity to the interface with the gain crystal, the two longitudinal modes have a linear polarization in which the two modes are perpendicularly polarized with respect to each other (i.e. the angular separation of the two linear polarizations is about 90°). Particularly, at the left end the first mode 31 is linearly polarized at a first angle shown at 33 of approximately 45° with respect to the principal axis 22 of the laser crystal 10 (which is aligned with the vertical reference 21) and the second polarization 32 is linearly polarized at a second angle shown at 34 of approximately −45° with the respect to the principal axis 22.

In an embodiment in which both the gain crystal 10 and the nonlinear crystal have polarization retardances of about one-quarter wave, it is believed that the one-way polarization of each mode is substantially circular at the interface between the two crystals. Accordingly within the laser crystal 10, both modes have a circular polarization as they propagate through the crystal; i.e. their polarizations are continually rotating in a circular pattern. However, the two polarizations rotate in opposite directions from each other. As shown in FIG. 3, within the laser crystal, the first mode 31 is rotating counterclockwise as shown by an arrow 35, and the second mode 32 is rotating clockwise as shown by an arrow 36.

Between the gain crystal 10 and the nonlinear crystal 12, the polarization of each of the two modes is substantially circular but rotating in opposite directions as in the laser crystal 10. At each point along the laser axis between the laser crystal 10 and the nonlinear material 12, it is believed that the sum of the two oppositely rotating polarizations will be substantially linear. Within the nonlinear crystal, the two modes have a circular polarization as they propagate through the crystal; however, the two modes rotate in an opposite direction from each other. At the right end of the laser cavity exiting from the interface with the nonlinear crystal 12, the two modes 31 and 32 again have linear polarizations separated by an angle shown at 38. In this embodiment, the two modes have perpendicular linear polarizations rotated 45° and −45° relative to the principal axis 25 of the nonlinear crystal 12. Particularly, the first mode 31 is approximately aligned with the vertical reference 21, and the second mode is approximately aligned with the horizontal reference 32. The principal axis 25 is at 45° with respect to the horizontal reference 30, and therefore the first and second modes are respectively oriented at 45° and −45° with respect to the principal axis 25. Thus, it can be seen that the polarization of the fundamental emission evolves rapidly throughout both crystals.

Due to the polarization retardance required of the Nd:YVO$_4$ crystal, the fundamental laser emission within the laser crystal is circularly polarized in two modes, contrary to conventional techniques that would attempt to obtain highest efficiency by linearly polarizing the fundamental emission along the c-axis. One advantage of the circular polarization within the laser crystal is that it is believed to substantially eliminate spatial hole burning and thereby improve efficiency, especially if the laser is operated in a single transverse mode.

Figure 4:
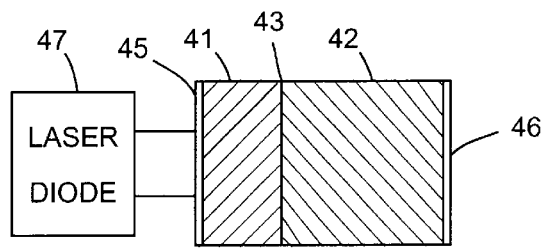
FIG. 4 is a side view of a monolithic frequency-converted solid state laser pumped by a laser diode.

FIG. 4 is a side view of an embodiment in which the laser cavity is defined within a monolithic assembly comprised of a slab 41 of birefringent laser crystal such as Nd:YVO$_4$ coupled to a slab 42 of nonlinear optical material such as KTP by optical contact, bonding, or any other suitable coupling process at an interface 43. The monolithic, single chip laser is configured, as discussed herein, so that the polarization retardance of the crystals achieves low-noise, two-polarization operation. Particularly, the combined polarization retardances of the gain crystal and the nonlinear crystal provides a odd multiple of $\lambda/2$.

Appropriate coatings, including a first coating 45 and a second coating 46 are formed on the two outside surfaces of the crystals to contain the fundamental emission within the laser cavity and transmit the frequency-converted radiation from either or both sides. For example, the first and second coatings 45 are formed for high reflection at the fundamental emission (e.g. 1064 nm) and for high transmission at the frequency-converted wavelength (e.g. 532 nm). In addition, the first coating 45 is designed to be transmissive at the pump wavelength. In this example, the pump source comprises a laser diode 47 arranged closely to butt-couple light into the gain crystal 41. In other embodiment, other pump arrangements, such as an optical fiber, or a relay lens, may be used to deliver the pump light.

In the monolithic embodiment, low-noise operation can be achieved over greater than 10° C. temperature ranges. Advantageously, low-noise operation is also largely insensitive to pumping conditions (pump laser power, wavelength, spot size) and is expected to be scalable to high output powers. The low-noise laser is therefore well-suited to applications that require a low-cost, rugged, and compact source of laser light.

In an embodiment discussed above, the laser comprises a birefringent gain material and a nonlinear crystal oriented for Type II frequency conversion. In other embodiments the nonlinear crystal could be oriented differently, or may not be used for conversion at all. For example instead of the frequency-doubling crystal, another arrangement could use another polarization-retarding element.

Figure 5:
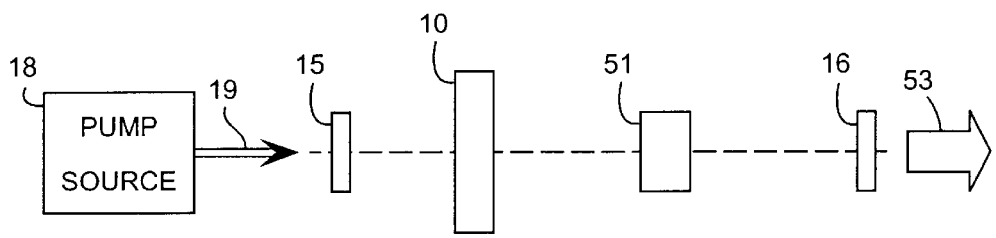
FIG. 5 is diagram of a laser that outputs a laser beam at the fundamental wavelength that is linearly polarized in orthogonal directions.

FIG. 5 is a schematic diagram of a laser that includes the birefringent gain crystal 10 and an intracavity optical element 51 that is not arranged for frequency doubling, such as a quarter wave plate. Since the optical element 51 does not frequency double the output, a laser output 53 is provided at the lasing wavelength.

The birefringent gain crystal 10 (e.g. Nd:YVO$_4$) is configured to have a predetermined amount of polarization retardance at the lasing wavelength. The net retardance in the remainder of the laser cavity is such that the total single-pass retardance of the fundamental emission within the laser cavity is an odd multiple of one half-wave (i.e. $\lambda/2$, $3\lambda/2$, $5\lambda/2$, $7\lambda/2$, and so forth). The intracavity optical element 51 (or combination of elements), in conjunction with the gain crystal 10, can provide the required polarization retardances. For example if the gain crystal 10 and the optical element 51 each provide about one quarter-wave retardance at the fundamental emission, then the total one-pass polarization retardances is $\lambda/2$. In this embodiment, the fundamental emission is not linearly polarized in the gain crystal 10, and therefore spatial hole burning is avoided.

For example in an embodiment that outputs a laser beam at the fundamental wavelength, the laser includes a birefringent gain crystal that retards the polarization by about a quarter-wave, and a second optical element such as a quarter-wave plate. In this configuration the output beam 53 at the fundamental wavelength will have two orthogonal, linear polarizations, as discussed and shown for the fundamental emission with reference to FIG. 3. Such a two-polarization laser may be useful in applications where polarization sensitivities need to be reduced; for example, in applications where pseudodepolarizers are presently used).

Figure 6:
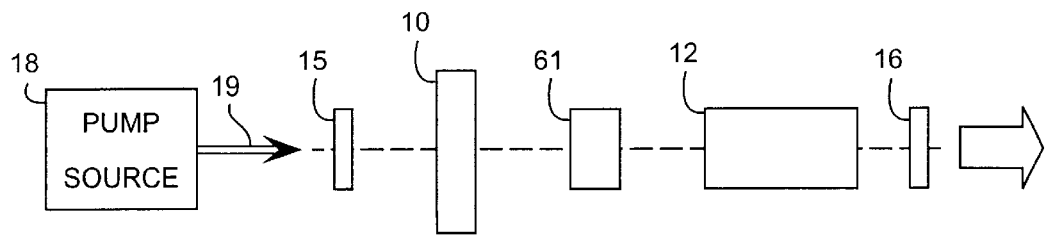
FIG. 6 is a schematic diagram of an embodiment of a laser that includes a birefringent gain crystal, a non-linear crystal, and an intracavity optical element, which provides a nonzero polarization retardance.

FIG. 6 is a schematic diagram of an embodiment of laser that includes the birefringent gain crystal 10, the non-linear crystal 12, and an intracavity optical element 61, which provides a nonzero polarization retardance. The polarization retardance of the laser cavity is such that the total single-pass retardance of the fundamental emission within the laser cavity is an odd multiple of one half-wave (i.e. $\lambda/2$, $3\lambda/2$, $5\lambda/2$, $7\lambda/2$, and so forth). The birefringent gain crystal 10 is configured to have a nonzero polarization retardance at the lasing wavelength so that the polarization of the fundamental emission is not linear in the laser crystal. The nonlinear crystal 12 is arranged for frequency conversion; however, it may or may not provide polarization retardance; for example the nonlinear crystal may not be birefringent.

If the nonlinear crystal does not provide the sufficient polarization retardance, then the intracavity optical element 61 can provide it. For example if the nonlinear crystal 12 is not birefringent (i.e. it provides zero retardance), and the gain crystal 10 and the optical element 61 each provide about one quarter-wave retardance at the fundamental emission, then the total one-pass polarization retardance is $\lambda/2$. Even if the nonlinear crystal does provide some polarization retardance, the optical element 61 may be useful to adjust the polarization retardance to provide the desired result.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A low-noise laser that provides an output laser beam comprising:
   a laser cavity;
   means for limiting the number of longitudinal lasing modes to substantially two modes;
   a birefringent gain crystal situated within said laser cavity, said gain crystal configured so that a fundamental laser emission within said laser crystal has a non-constant polarization, thereby providing a first predetermined nonzero amount of polarization retardance at about a fundamental lasing wavelength; and
   an optical element situated within said laser cavity, said optical element configured to provide a second nonzero predetermined amount of polarization retardance that, in conjunction with the birefringent gain crystal, provides a total single-pass retardance for said laser cavity approximately equal to an odd multiple of one-half wave so that substantially two longitudinal modes of the fundamental laser emission propagate along different polarization patterns within said laser crystal.

2. The low-noise laser of claim 1 wherein said first predetermined retardance is approximately one-quarter wave, and said second predetermined retardance is approximately one-quarter wave.

3. The low-noise laser of claim 2 wherein said gain crystal has a length that provides said quarter-wave retardance.

4. The low-noise laser of claim 1 wherein said birefringent gain crystal comprises $Nd:YVO_4$.

5. The low-noise laser of claim 1 wherein said optical element comprises a quarter-wave plate.

6. The low-noise laser of claim 5 wherein the laser output from said laser comprises said two longitudinal modes at about said lasing wavelength, and said laser output comprises substantially a first linear polarization and a second linear polarization that is orthogonal to said first linear polarization.

7. The low-noise laser of claim 1 wherein said optical element comprises a nonlinear crystal situated within said laser cavity for frequency conversion of said two longitudinal modes of fundamental laser emission.

8. The low-noise laser of claim 7 further comprising a second optical element in said laser cavity that provides a third nonzero polarization retardance that, in conjunction with the second and first nonzero predetermined amount of polarization retardances, provides said total single-pass retardance for said laser cavity.

9. The low-noise laser of claim 7 wherein the principal crystal axis of said gain crystal is oriented in a first direction orthogonal to the axis of said laser cavity, and the principal axis of said nonlinear crystal is oriented in second direction orthogonal to the axis of said laser cavity, said first and said second directions having a nonzero offset angle.

10. The low-noise laser of claim 9 wherein said nonzero offset angle is within a range of about 30° to about 60°.

11. The low-noise laser of claim 9 wherein said nonzero offset angle is about 45°.

12. The low-noise laser of claim 7 wherein said nonlinear crystal is arranged for Type II doubling.

13. The low-noise laser of claim 7 wherein said nonlinear crystal is temperature-tuned to provide said predetermined polarization retardance.

14. The low-noise laser of claim 1 wherein said gain crystal is bonded to said optical element to provide a monolithic structure.

15. The low-noise laser of claim 1 wherein said laser cavity, said gain crystal, and said optical element are configured to substantially eliminate spatial hole burning in said laser.

16. The low-noise laser of claim 1, wherein:
   said birefringent gain crystal is configured so that said fundamental laser emission has a rotating polarization within said gain crystal; and
   said optical element comprises a nonlinear crystal;
   wherein the principal crystal axes of said gain crystal and said nonlinear crystal are arranged to be substantially offset with respect to each other.

17. The low-noise laser of claim 16 wherein said first and second polarization retardances, and said offset between said principal crystal axes are selected so that said fundamental laser emission comprises substantially two longitudinal modes that have substantially orthogonal polarizations at the external interfaces of the gain crystal and the nonlinear crystal.

18. The low-noise laser of claim 16 wherein said gain crystal provides an approximately quarter-wave polarization retardance and said nonlinear crystal provides an approximately quarter-wave polarization retardance.

19. The low-noise laser of claim 18 wherein said gain crystal has a length that provides said quarter-wave retardance.

20. The low-noise laser of claim 16 wherein said laser is configured to provide substantially a single transverse mode.

21. The low-noise laser of claim 20 wherein said substantially single transverse mode includes a $TEM_{00}$ mode.

22. The low-noise laser of claim 16 wherein said birefringent gain crystal comprises $Nd:YVO_4$.

23. The low-noise laser of claim 16 wherein the principal crystal axis of said gain crystal is oriented in a first direction orthogonal to the axis of said laser cavity, and the principal axis of said nonlinear crystal is oriented in second direction orthogonal to the axis of said laser cavity, and said first and said second directions define a nonzero offset angle.

24. The low-noise laser of claim 23 wherein said offset angle is approximately 45°.

25. The low-noise laser of claim 16 wherein said nonlinear crystal is arranged for Type II doubling.

26. The low-noise laser of claim 16 wherein said nonlinear crystal is temperature-tuned to provide said polarization retardance.

27. The low-noise laser of claim 16 wherein said gain crystal is coupled to said optical element to provide a monolithic structure.

28. The low-noise laser of claim 16 wherein said laser cavity, said gain crystal, and said nonlinear crystal are configured to substantially eliminate spatial hole burning in said laser.

29. The low-noise laser of claim 16 wherein said frequency-selection system comprises at least one of an intracavity etalon, a narrow gain curve of said gain crystal, and a short cavity length.

30. The low-noise laser of claim 1 wherein said means for limiting the number of longitudinal modes comprises at least one of an intracavity etalon, a narrow gain curve of said gain crystal, and a short cavity length.

31. A low-noise laser comprising:
a laser cavity;
a birefringent gain crystal comprising Nd:YVO$_4$ situated within said laser cavity, said gain crystal configured to have an approximately quarter-wave polarization retardance at said lasing wavelength;
a nonlinear doubling crystal configured in a Type II arrangement to have approximately quarter-wave polarization retardance that, in conjunction with the birefringent gain crystal, provides a total single-pass retardance at said lasing wavelength that is substantially an odd multiple of one-half wave; and
means for restricting the longitudinal lasing modes to substantially two lasing modes, including at least one of short cavity length, narrow gain curve, or an etalon;
wherein said gain crystal and said doubling crystal are arranged so that the lasing state of said laser comprises two longitudinal modes each of which follows a different polarization pattern within said laser cavity.

32. The laser of claim 31 wherein said gain crystal is polished to provide said quarter-wave polarization retardance at said lasing wavelength.

33. The laser of claim 31 wherein said gain crystal is temperature-tuned to provide said quarter-wave polarization retardance at said lasing wavelength.

34. A low-noise frequency-converted laser that outputs at least two longitudinal modes of low-noise frequency-converted laser light, comprising:
a laser cavity;
a birefringent gain crystal situated in said laser cavity;
a frequency-conversion crystal situated within said laser cavity;
a mode-selection system that substantially limits the number of longitudinal modes allowed to oscillate in said laser cavity;
wherein said gain crystal and said frequency conversion crystal each have a nonzero polarization retardance at the fundamental emission wavelength, the sum of said polarization retardances selected to provide substantially two rotating longitudinal modes of fundamental laser emission within said gain crystal and thereby reduce spatial hole burning; and
wherein said frequency-conversion crystal is arranged to frequency-convert said two fundamental longitudinal modes to create a low-noise frequency-doubled laser output that has substantially two longitudinal frequency-converted modes.

35. The low-noise frequency-converted laser of claim 34 wherein said frequency conversion crystal is arranged for Type II doubling of said two longitudinal modes of fundamental laser emission to provide two longitudinal frequency-converted modes are polarized approximately orthogonally.

36. The low-noise frequency-converted laser of claim 34 wherein said gain crystal comprises a narrow gain bandwidth that substantially limits laser emission to said two longitudinal modes.

37. The low-noise frequency-converted laser of claim 36 further comprising an etalon that, in conjunction with said gain crystal, substantially limits laser emission to said two longitudinal modes.

38. The low-noise frequency-converted laser of claim 36 wherein said gain crystal comprises Nd:YVO$_4$.

39. A method of generating a stable dual longitudinal mode laser emission in a solid state laser that includes a birefringent gain crystal within a laser cavity, comprising:
generating a first longitudinal mode of fundamental laser emission that propagates along a first rotating polarization pattern within the gain crystal;
generating a second longitudinal mode of fundamental laser emission that propogates along a second rotating polarization pattern within the gain crystal, said first and second polarization patterns limiting interaction between said first and second modes within the gain crystal, thereby reducing spatial hole burning; and
frequency converting said first and second longitudinal modes of laser emission in a nonlinear crystal within the laser cavity to provide a stable, dual longitudinal mode freguency-converted output laser beam.

40. The method of claim 39 wherein said laser cavity defines a laser axis, said gain crystal and said nonlinear crystal define surfaces proximate to each other and surfaces distal from each other along the laser axis, and said two longitudinal modes of said fundamental laser emission are substantially linearly polarized in perpendicular directions at said distal surfaces.

41. The method of claim 40 wherein said birefringent gain crystal defines first and second crystal axes, and said nonlinear crystal defines first and second crystal axes, and the linear polarization directions of said two orthogonal longitudinal modes at the external interface of said gain crystal are oriented at approximately 45° with respect to said first and second crystal axes of said gain crystal, and the linear polarization directions of said two orthogonal longitudinal modes at the external interface of said nonlinear crystal are oriented at approximately 45° with respect to said first and second crystal axes of said nonlinear crystal.

42. The method of claim 39 wherein said frequency conversion comprises Type II doubling of said two longitudinal modes.

* * * * *